July 14, 1970   F. W. BRUNKHARDT ET AL   3,520,632

SCAVENGE PUMP AND ACCESSORY DRIVE SYSTEM

Filed Nov. 19, 1968   2 Sheets-Sheet 1

INVENTORS
FREDERICK W. BRUNKHARDT
STANLEY ZAIMOR

BY *James A. Kane*

AGENT

United States Patent Office 3,520,632
Patented July 14, 1970

3,520,632
SCAVENGE PUMP AND ACCESSORY DRIVE SYSTEM
Frederick W. Brunkhardt, South Glastonbury, and Stanley Zaimor, Jr., Hartford, Conn., assignors to United Aircraft Corporation, East Hartford, Conn., a corporation of Delaware
Filed Nov. 19, 1968, Ser. No. 777,554
Int. Cl. F04d 9/00, 13/02, 29/06
U.S. Cl. 415—122                    14 Claims

ABSTRACT OF THE DISCLOSURE

An accessory drive system for a gas turbine engine having two passageways for a gas and oil mixture. One passageway connects to a gas and oil separator and a pump. The other passageway connects to lubricate the drive support means.

BACKGROUND OF THE INVENTION

The present invention relates to an accessory gear system for driving the accessories of an engine from the engine, and more particularly to an accessory drive system which is simultaneously a pump and a separator.

In gas turbine engines, especially those used in aircraft, the accessories are frequently mounted as a unit in an accessory case. When the accessory case, and hence the accessory drive system, is used in conjunction with a turbofan engine, a particular problem arises in that the amount of space available is extremely limited. The problem becomes magnified when it is necessary to use a number of engine accessories, such as an oil-air separator, scavenge pump, in addition to the accessory drive system.

The present invention provides an accessory drive system which includes a number of engine accessories and which is capable of being mounted in the narrow confines of a duct of a turbofan engine.

SUMMARY OF THE INVENTION

A primary object of this invention is to provide an accessory drive system which is compact and additionally has the capability of pumping a fluid and separating any entrapped gases from the fluid.

The present invention for illustrative purposes only will be described in the environment of a turbofan engine. The foregoing object is accomplished by providing a case or housing which is mounted within the fan duct of the turbofan engine. Internal of the housing is a compartment within which a drive shaft is positioned. The drive shaft of the accessory drive system may be powered by any conventional means, for example, from the engine compressor shaft. In the present embodiment, the drive shaft is a substantially radially extending member which carries a first gear means, a second gear means and a pump means. Additionally, the drive shaft has means through which the gases, separated from the incoming fluid, are permitted to escape.

Surrounding the drive shaft and also positioned in the compartment is the drive member. This drive member is spaced from the drive shaft and forms a first passageway therebetween. In the preferred embodiment of the present invention, the drive member is driven by the second gear means through a plurality of splines on each member, that is, the connection between the second gear means and the drive member is a spline connection; the drive member also includes a circumferential slot in which the first gear means cooperates, the purpose of this construction being to limit any upward movement of the drive shaft. The drive member additionally is spaced from the walls of the housing and forms a second passageway therebetween.

The fluid, most likely oil with entrapped gases, of the present invention enters the accessory drive system through inlet means in the compartment. The inlet means are in communication with the first passageway, and in the present construction, most of the fluid enters the first passageway. The second passageway which is in communication with the first passageway contains means to permit a metered portion of the fluid to enter the second passageway. These means may be a plurality of openings with a controlled diameter or an orifice, either means being acceptable.

The drive member side which helps to form the first passageway includes a tapered portion along its diameter. The function of this tapered portion on the drive member is to cause the fluid to move outward, facilitate flow and lead the fluid to the first gear means which is located downstream from the tapered portion. The first gear means then imparts a rotating motion to the liquid, the liquid being separated from the entrapped gases by centrifugal force. The separated liquid thereafter flows through passages between the first gear means and the drive member and the second gear means and the drive member to the base or bottom of the drive shaft. The separated gas flows along the drive shaft and out an opening in the drive shaft.

As hereinbefore mentioned, a pump means is mounted on the drive shaft, this pump means being in communication with the first passageway, this constituting the inlet of the pump means. The outlet means of the pump is contained, in the present embodiment, in the accessory case. The accessory case or housing additionally contains a reservoir or sump which is in communication with the second passageway. As hereinbefore noted, the second passageway permits a metered portion of flow to enter from the first passageway and flow therethrough, this metered flow being used to lubricate the means to support the drive member. Therefore, the flow which flows through the second passageway accumulates in the reservoir and since this reservoir is in communication with the pump, this fluid is likewise pumped through the outlet means.

DESCRIPTION OF THE PREFERRED EMBODIMENTS

Figure 1:
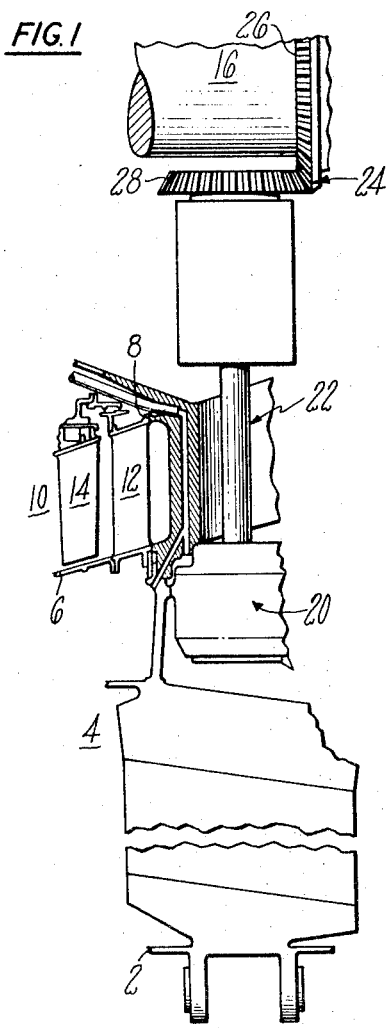
FIG. 1 is a schematic showing of the accessory drive system positioned in the duct of a turbofan engine.

The invention is shown in connection with a turbofan engine which includes an outer duct wall 2 for the annular duct 4 through which fan air passes and intermediate duct wall 6 between the compressor of the engine and the fan duct, and an inner duct wall 8 forming the inner wall of the gas path 10 for gas from the compressor. Obviously, the compressor casing duct is annular and carries on its inner wall rows of compressor stator vanes 12 which alternate with rows of blades 14 on the compressor rotor 16. Compressor rotor 16 is supported on bearings (not shown) and is the drive member for the accessory drive system hereinafter described in greater detail.

As illustrated in FIG. 1, accessory drive casing or housing 20 is positioned within duct 4. Extending from within accessory drive casing 20 to compressor rotor shaft 16 is drive shaft 22. Drive shaft 22 is supported by conventional bearing means which are considered a part of the invention herein, and it is driven through gearing means 24. As herein contemplated, gearing means 24 comprises gear 26 which is carried by rotor 16 and bevel gear 28 which is positioned on one end of drive shaft 22.

Figure 2:
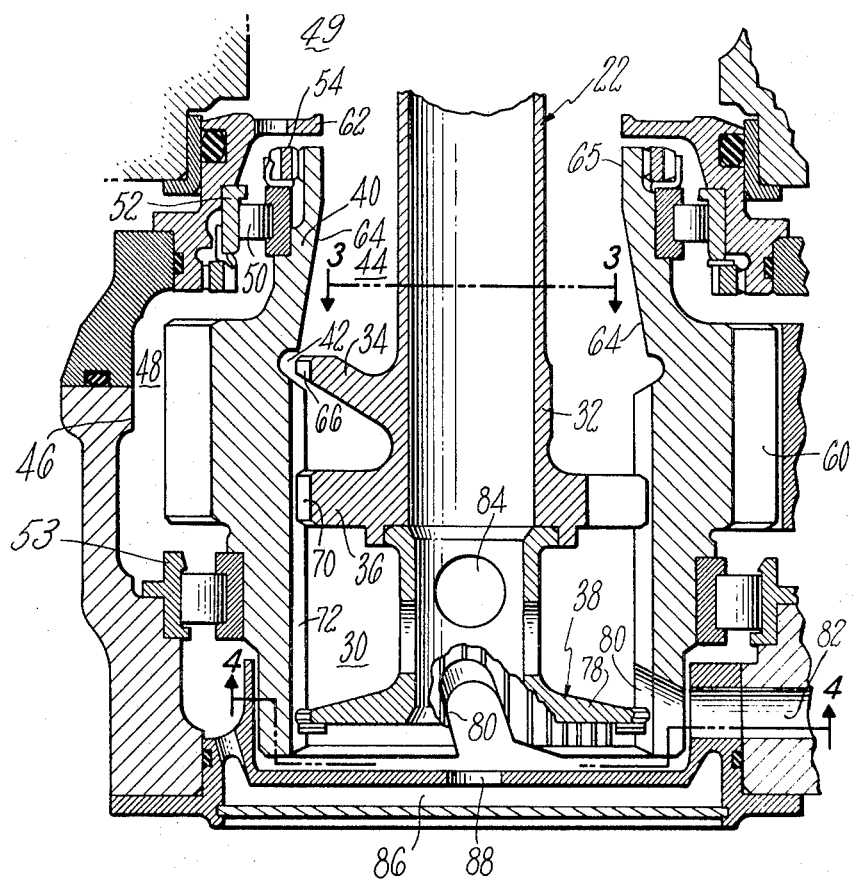
FIG. 2 is a sectional view of an accessory drive system, the scavenge pump and separator.

For a more detailed description of the accessory drive system, reference is now made to FIG. 2. Accessory casing 20 includes compartment 30 within which is positioned the other end or base end 32 of drive shaft 22. As shown in this embodiment, base end 32 of shaft 22 carries first gear means 34, a second gear means 36 spaced radially outward from the first gear means 34 and a pump means 38 spaced radially outward from the second gear means 36, it being obvious that each of the foregoing along with shaft 22 are positioned within compartment 30.

Also positioned within compartment 30 is drive member 40. Drive member 40 surrounds drive shaft 22 and is spaced therefrom. In the present embodiment, second gear means 36 is the gear means through which drive member 40 is driven. More specifically, when rotor 16 through gearing means 24 drives drive shaft 22, drive shaft 22 drives drive member 40 through second gear means 36. Drive member 40 includes circumferential slot 42 within which first gear means 34 cooperates. The purpose of this particular construction is to provide a positive means for limiting the upward movement of drive shaft 22.

As hereinbefore mentioned, drive member 40 is spaced from drive shaft 22 so as to form first passageway 44. Additionally, drive member 40 is spaced from wall 46 of casing 20 so as to form second passageway 48. Positioned within second passageway 48 is support means 50, herein shown as bearing 52 and 53, for drive member 40. As shown, second passageway 48 is in communication with first passageway 44 which is in turn in communication with inlet means or opening 49 in casing 20. Therefore, any fluid entering through inlet 49 would enter first passageway 44 and second passageway 48; however, second passageway 48 includes means 54 for metering or controlling the amount of flow entering second passageway 48, these means herein being illustrated as an orifice.

Drive member 40 additionally carries output drive means 60 for driving the engine accessories, herein not shown.

In operation, oil or some other fluid enters accessory casing 20 through inlet means 49. On entering, the fluid enters divider flange 62, most of the fluid entering first passageway 44. The fluid thereupon flows within first passageway 44 and encounters a taper 64 which is positioned off wall 65 of drive member 40. The taper 64 tends to drive the fluid outward, or towards wall 65 and additionally facilitates flow and leads the fluid towards first gear means 34. First gear means 34 may be of any configuration; however, the present embodiment has found a three-lobe construction to be desirable. Each of the lobes of first gear means 34 contains spline 66, the purpose of which is to facilitate assembly of the drive system.

First gear means 34 imparts a rotating motion to the fluid as it contacts the fluid. The construction of the first gear means 34 which additionally limits upward movement of shaft 22, as hereinbefore described, is such that the fluid passes through grooves 68 between first gear means 34 and drive member 40. Second gear means 36 which drives drive member 40 is of a similar construction as first gear means 34 except in the present embodiment, second gear means 36 employs six lobes. Similarly, the lobes of second gear means 36 contains splines 70, splines 70 cooperating with splines 72 of drive member 40 to effectuate the actual drive connection. Just as the first gear means provides grooves 68 to permit the passage of the fluid, second gear means provides grooves 74 to permit the flow of fluid.

Figure 4:
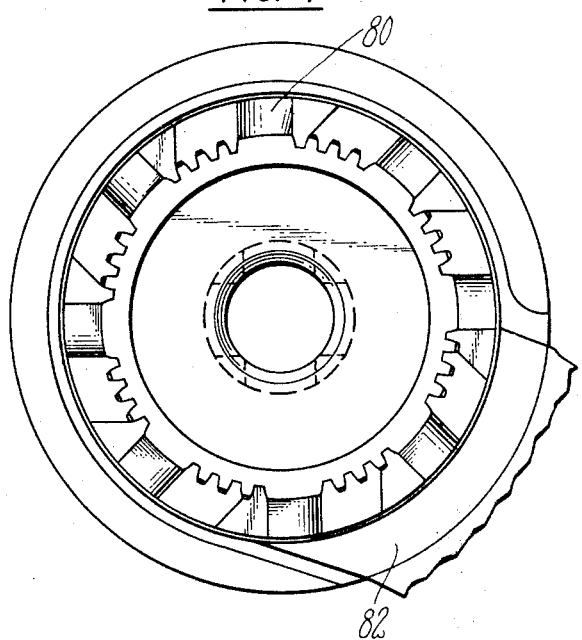
FIG. 4 is a view taken substantially along the line 4—4 of FIG. 2.
Figure 3:
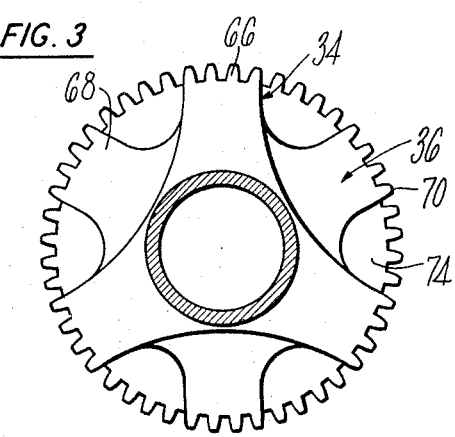
FIG. 3 is a view taken substantially along the line 3—3 of FIG. 2.

As mentioned hereinbefore, the first gear means imparts a rotating motion to the incoming fluid, and centrifugal action causes separation of entrapped gases from the fluid. As noted, the separated fluid flows past the first and second gear means and subsequently encounters pump means 38. Pump means 38 is herein illustrated as a spinner flange 78 carried in shaft 22. The fluid comes in contact with spinner 78 and is pumped or forced out slots 80 contained in drive member 40. Slots 80 are in communication wtih outlet means 82, this latter construction being clearly shown in FIG. 4. It should be noted that slots 80 are angular, or more specifically, sloped from front to rear. In the present embodiment, outlet means 82 are illustrated as a slotted groove and hence operating for only a portion of one revolution of spinner 78. It should be clear that the outlet means 82 may be a full opening and hence operate over the entire revolution of spinner 78.

The gas which has been separated from the fluid at the first gear means 34 meanwhile remains substantially adjacent to drive shaft 22, and is permitted to escape through an opening 84 in drive shaft 22. The gas is then led to any convenient position not shown herein. It should now be clear how the present invention functions as an accessory drive system, a scavenge pump and a centrifugal separator.

As hereinbefore described, most of the incoming fluid enters the first passageway 44. The portion which does not enter first passageway 44 enters second passageway 48 through a meter-orifice 54, this metering means controlling the amount of fluid entering from the first passageway. From orifice 54 the fluid flows past housing 52 and housing 46, thus lubricating each bearing. The fluid passing through second passageway 48 is accumulated in reservoir or sump 86. Sump 86 is in communication with pump means 38 through opening 88. Therefore, as the liquid in sump 86 rises, it flows through opening 88, and primarily because of the scooping action of slots 80 in drive member 40 the fluid is carried to a level where it may be discharged through outlet means 82.

We claim:
1. An accessory drive system for use in a gas turbine engine including means for driving the accessory drive system and output means driven by the accessory drive system, the accessory drive system comprising:
   a housing, the housing having a compartment therein, the compartment having inlet means and outlet means for the entrance and exit of a fluid,
   a drive shaft positioned within the compartment and driven by the engine drive means,
   a drive member driven by the drive shaft for driving the output means, the drive member being positioned within the compartment and being spaced from the drive shaft on one side to form a first passageway and on its other side spaced from the compartment to form a second passageway, the first passageway being in communication with the inlet fluid means and the second passageway, the second passageway permitting a metered portion of fluid to pass therethrough, and means for supporting the drive member, the supporting means being lubricated by the metered fluid, and
   a pump means driven by the drive shaft, the first passageway constituting the pump inlet and the pump being in communication with the outlet means, the pump thereby causing a flow of fluid from the first passageway through the outlet means.
2. An accessory drive system as in claim 1 wherein:
   the housing includes a reservoir into which the metered flow accumulates, the pump means being in communication with the reservoir thereby causing the metered flow to be pumped through the outlet means.
3. An accessory drive system as in claim 2 wherein;
   the drive member and the drive shaft include centrifugal means for separating entrapped gases from the incoming fluid.

4. An accessory drive system as in claim 3 wherein;
the drive member side forming the first passageway includes a tapered portion over its diameter, the tapered portion causing the liquid to flow outwardly with respect to the drive shaft, and the drive shaft has an opening at its base for the exit of the gas which has been separated from the fluid.

5. An accessory drive system comprising:
a housing, the housing having a compartment therein, the compartment having inlet and outlet means for the entrance and exit of a fluid,
a drive shaft positioned within the compartment,
a first gear means positioned on the drive shaft,
a second gear means positioned on the drive shaft,
a drive member driven by the second gear means, the drive member being positioned within the compartment and being spaced from the drive shaft on one side to form a first passageway and on its other side spaced from the compartment walls to form a second passageway, the first passageway being in communication with the inlet means and the second passageway, the second passageway permitting a metered portion of fluid to pass therethrough, and bearing means for supporting the drive member, the bearing means being lubricated by the metered fluid, and
a pump means driven by the drive shaft, the first passageway constituting the pump inlet and the pump being in communication with the outlet means, the pump thereby causing a flow of fluid from the first passageway through the outlet means.

6. An accessory drive system as in claim 5 wherein;
the housing includes a reservoir into which the metered flow accumulates, the pump means being in communication with the reservoir thereby causing the metered flow to be pumped through the outlet means.

7. An accessory drive system as in claim 5 wherein:
the drive member includes a circumferential slot and the first gear means cooperates within this slot to limit any upward movement of the drive shaft.

8. An accessory drive system as in claim 7 wherein;
the second gear means includes a plurality of splines, the second gear means driving the drive member through these cooperating splines.

9. An accessory drive system as in claim 8 wherein;
the first gear means imparts a swirling motion to the liquid,
the drive member forming the first passageway includes a tapered portion on its diameter, the tapered portion combined with the swirling motion of the liquid separating the liquid from any entrapped gases,
the second gear means and the drive member having a plurality of passageways therebetween for the passage of the separated liquid to the pump means; and
the drive shaft has means for permitting the exit of separated gas.

10. An accessory drive system and pump system comprising;
a housing, the housing having a compartment therein, the compartment having inlet means and outlet means for the entrance and exit of a fluid,
a drive shaft positioned within the compartment,
a drive member driven by the drive shaft, the drive member being positioned within the compartment and being spaced from the drive shaft on one side to form a first passageway and on the other side being spaced from the compartment walls to form a second passageway, the second passageway being in communication with the first passageway, the first passageway being in communication with the inlet means, the second passageway permitting a metered portion of fluid to flow therethrough, and means for supporting the drive member, the supporting means being lubricated by the metered fluid, and
a pump means connected to the drive shaft, the pump means comprising a spinner mounted at the end of the drive shaft distal from the inlet and hence within the first passageway, the spinner forcing fluid from the first passageway through the outlet means.

11. An accessory drive system and pump system as in claim 10 wherein;
the housing includes a reservoir into which the metered flow accumulates, and
the pump means includes a plurality of angular slots which are in communication with the reservoir, the shape of the slots being such so as to scoop any metered liquid from the reservoir and thereafter pump it through the oulet means.

12. An accessory drive system and pump system as in claim 11 wherein;
the drive shaft includes a first gear means and a second gear means, and
the drive member includes a circumferential slot in which the first gear means cooperates to limit any upward movement of the drive shaft.

13. An accessory drive system and pump system as in claim 12 wherein;
the second gear means includes a plurality of splines, the second gear means driving the drive member through these cooperating splines.

14. An acessory drive system and pump system as in claim 12 wherein;
the first gear means imparts a swirling motion to the liquid,
the drive member forming the first passageway includes a tapered portion as its diameter, the tapered portion combined with the swirling motion of the liquid separating the liquid from any entrapped gases,
the second gear means and the drive member having a plurality of passageways therebetween for the passage of the separated liquid to the pump means; and
the drive shaft has means for permitting the exit of separated gas.

References Cited

UNITED STATES PATENTS

| 2,306,301 | 12/1942 | Curtis | 103—113 XR |
| 2,610,788 | 9/1952 | Edwards | 103—113 XR |
| 3,269,118 | 8/1966 | Benedict et al. | 60—39.33 XR |

ROBERT M. WALKER, Primary Examiner

U.S. Cl. X.R.

60—39.08; 415—176